US010263302B1

(12) United States Patent
Fang et al.

(10) Patent No.: US 10,263,302 B1
(45) Date of Patent: Apr. 16, 2019

(54) BAFFLE STRUCTURE FOR HEAT DISSIPATION

(71) Applicant: NATIONAL CHUNG SHAN INSTITUTE OF SCIENCE AND TECHNOLOGY, Taoyuan (TW)

(72) Inventors: Fu-Min Fang, Taoyuan (TW); Chih-Hsien Chung, Taoyuan (TW); Kuo-Kuang Jen, Taoyuan (TW); Hsin-Chi Chen, New Taipei (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 15/832,995

(22) Filed: Dec. 6, 2017

(51) Int. Cl.
*H01M 4/02* (2006.01)
*H01M 10/6556* (2014.01)
*H01M 10/625* (2014.01)
*H01M 2/10* (2006.01)

(52) U.S. Cl.
CPC ..... *H01M 10/6556* (2015.04); *H01M 2/1083* (2013.01); *H01M 10/625* (2015.04); *H01M 2220/20* (2013.01)

(58) Field of Classification Search
CPC ...................................................... H01M 4/02
See application file for complete search history.

(56) References Cited

U.S. PATENT DOCUMENTS

| | | | | |
|---|---|---|---|---|
| 2010/0213887 | A1* | 8/2010 | Louch | H02J 7/35 320/101 |
| 2013/0244064 | A1* | 9/2013 | Ibok | H01M 16/00 429/9 |
| 2016/0293906 | A1* | 10/2016 | Ito | A01D 34/64 |
| 2017/0294693 | A1* | 10/2017 | Tong | H01M 10/613 |

\* cited by examiner

*Primary Examiner* — Jacob B Marks
(74) *Attorney, Agent, or Firm* — Schmeiser, Olsen & Watts, LLP

(57) ABSTRACT

A baffle structure for heat dissipation, mounted on an electric vehicle on top of which a battery pack is mounted, includes a base, a plurality of baffle fins and a mask. The base is connected to the battery pack. The baffle fins are disposed on the base. The baffle fins each have a first end and a second end. The mask covers the baffle fins. The mask includes at least an air inlet and at least an air outlet which correspond in position to the first and second ends, respectively. The baffle structure guides hot air out, takes up no space inside the electric vehicle, dispenses with a need to be connected to any external cooling system, and saves electrical power supplied by the battery pack.

10 Claims, 6 Drawing Sheets

BAFFLE STRUCTURE FOR HEAT DISSIPATION

FIELD OF THE INVENTION

The present invention relates to baffle structures for heat dissipation and, more particularly, to a baffle structure adapted for use in heat dissipation and applied to battery packs of electric vehicles.

BACKGROUND OF THE INVENTION

Electric vehicles are powered by lithium ion batteries. To this end, battery packs of the electric vehicles each contain battery cells connected in series to achieve the total voltage requirement of the battery packs. Numerous series-connected battery cells are contained in each battery pack of a large electric vehicle, such as a bus. Heat is generated from both the battery cells and buses connected therebetween to the detriment of the performance of the battery packs.

In an attempt to solve the aforesaid problem, a conventional technology discloses housing battery packs inside a vehicle and cooling them with air conditioning systems thereof. However, the aforesaid prior art has some drawbacks: reduction of available space in the vehicle, and making it sooner for the battery packs to run out of power.

In addition, the battery packs undergo heat dissipation through casings thereof only. The casings each have so small a surface contact area that the aforesaid heat dissipation is hardly efficient. As a result, not only are the battery packs poor in performance, but their service life is also short.

SUMMARY OF THE INVENTION

In view of the aforesaid drawbacks of the prior art, it is an objective of the present invention to provide a baffle structure adapted for heat dissipation and comprising heat dissipation-oriented baffle fins mounted on top of an electric vehicle to not only speed up heat dissipation by air flowing over the moving electric vehicle but also guide hot air out because of the shape of the baffle fins.

In order to achieve the above and other objectives, the present invention provides a baffle structure for heat dissipation, mounted on an electric vehicle on top of which a battery pack is mounted, the baffle structure comprising a base, a plurality of baffle fins and a mask. The base is connected to the battery pack. The plurality of baffle fins is disposed on the base. The baffle fins each have a first end and a second end. The mask covers the plurality of baffle fins. The mask comprises at least an air inlet and at least an air outlet. The at least an air inlet corresponds in position to the first ends of the baffle fins. The at least an air outlet corresponds in position to the second ends of the baffle fins.

The baffle structure for heat dissipation of the present invention is advantageous in that coordination of the baffle fins and the mask enables air flowing over the moving electric vehicle to be automatically introduced into between the baffle fins through the at least an air inlet to cool the baffle fins before being discharged from the at least an air outlet. Hence, the baffle structure for heat dissipation need not be mounted inside the electric vehicle and needs no external cooling systems. Furthermore, the baffle structure for heat dissipation takes up no space inside the electric vehicle and saves the electrical power of the battery pack.

In an embodiment, the baffle structure for heat dissipation further comprises a support frame disposed on top of the electric vehicle and adapted to support and lift the mask. The at least an air inlet opens downward.

In an embodiment, the baffle structure for heat dissipation further comprises at least an axial fan disposed at the at least an air outlet.

In an embodiment, the at least an air outlet opens laterally relative to the electric vehicle.

In an embodiment, the at least an air outlet is provided in a plural number to open toward two lateral sides of the electric vehicle, respectively.

In an embodiment, the baffle structure for heat dissipation further comprises at least a solar panel disposed above the mask. The at least a solar panel has flexibility.

In an embodiment, the baffle structure for heat dissipation further comprises at least an axial fan disposed at the at least an air outlet and connected to the at least a solar panel to receive electrical power therefrom.

In an embodiment, the electric vehicle is advancing in a direction between which and a line joining the first and second ends an included angle of 40° is formed.

The mask is lifted by the support frame and hung in the air; hence, the at least an air inlet can be disposed on the bottom side of the baffle structure for heat dissipation to prevent intrusion of rainwater or foreign bodies into the mask.

The at least a solar panel disposed above the mask makes good use of sunlight to generate electrical power which is then supplied to the at least an axial fan disposed at the at least an air outlet; hence, hot air is removed from the mask by the at least an axial fan whenever the electric vehicle is not moving, thereby maintaining the cooling function of the baffle structure for heat dissipation.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
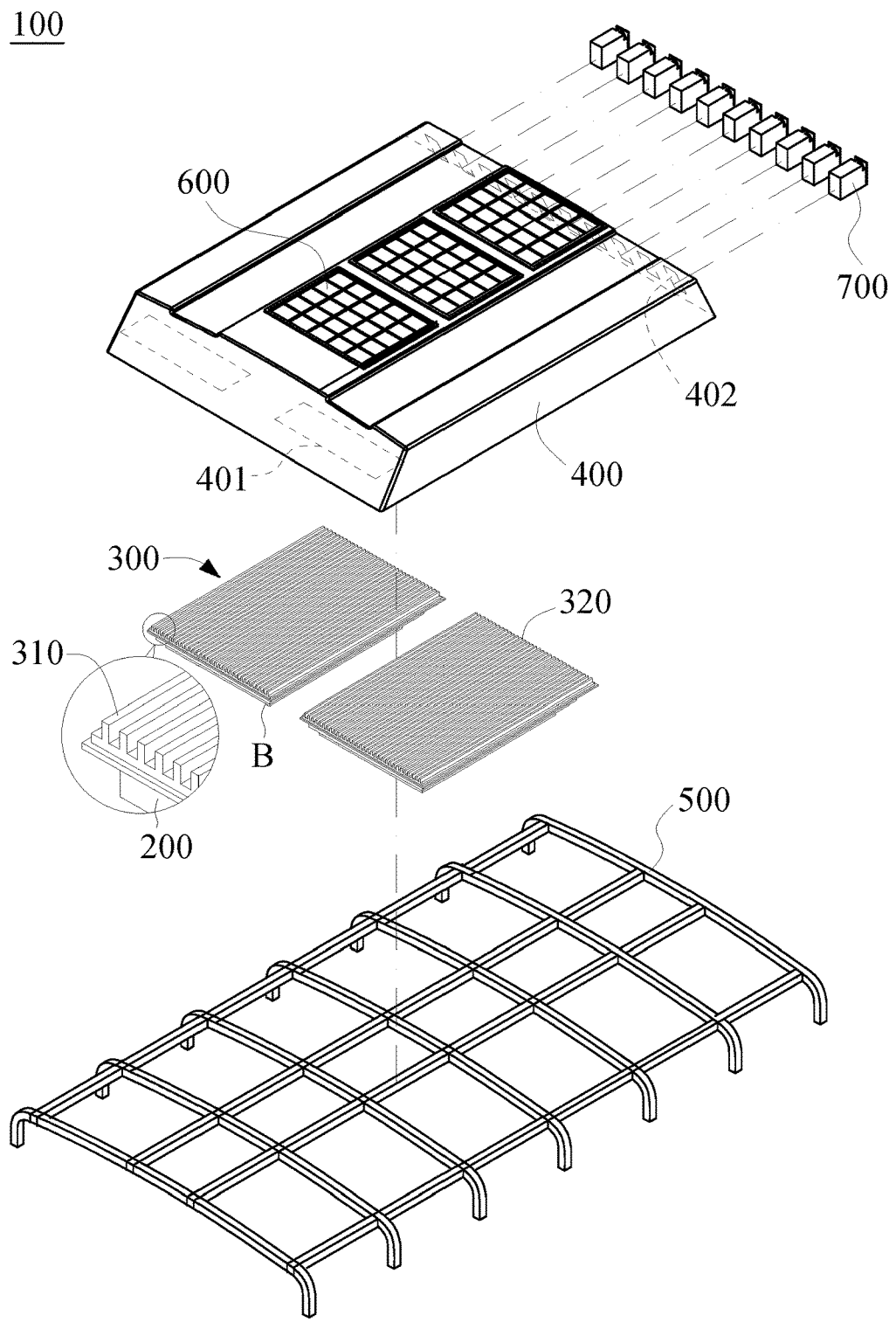
FIG. 1 is an exploded view of a baffle structure for heat dissipation according to an embodiment of the present invention.
Figure 2:
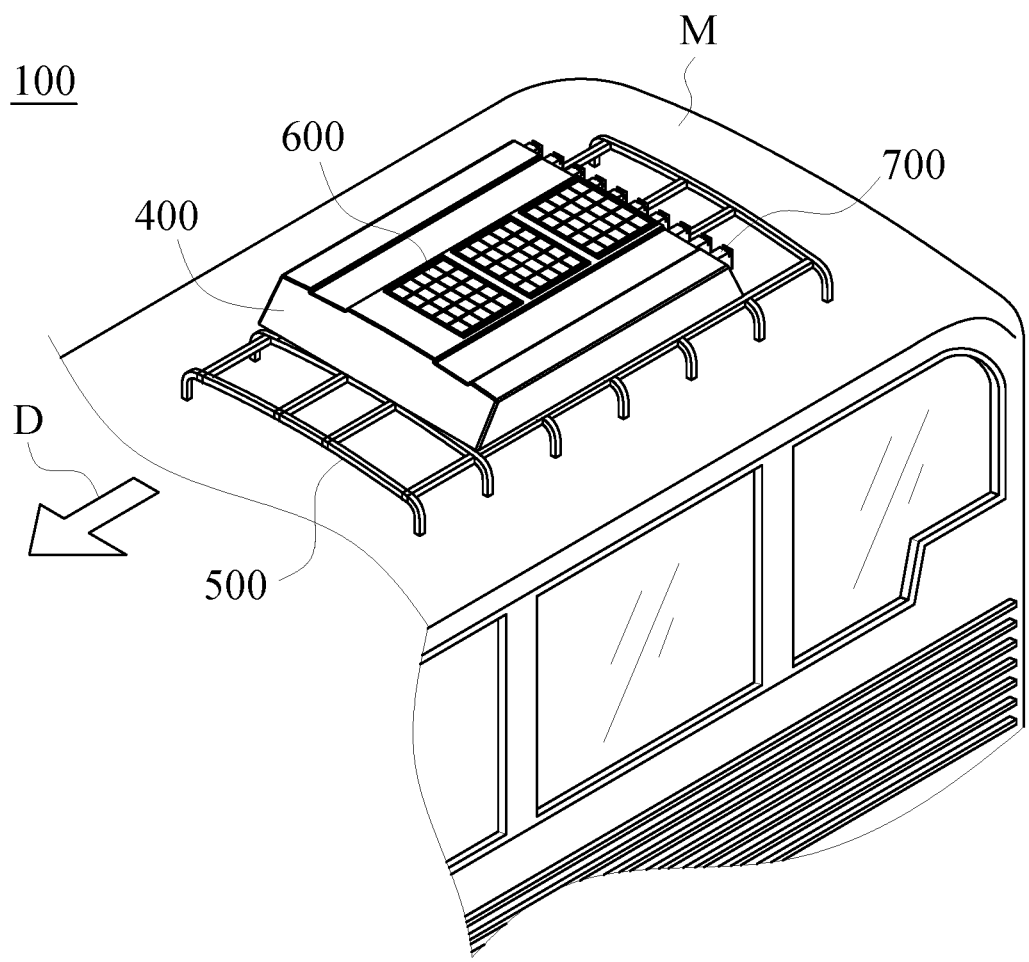
FIG. 2 is a schematic view of how to mount in place the baffle structure for heat dissipation of FIG. 1.

Referring to FIG. 1 and FIG. 2, a baffle structure 100 for heat dissipation according to the present invention is mounted on an electric vehicle M. A battery pack B is disposed on top of the electric vehicle M. The baffle structure 100 for heat dissipation comprises a base 200, a plurality of baffle fins 300, a mask 400, a support frame 500, a plurality of solar panels 600, and a plurality of axial fans 700.

The battery pack B of the electric vehicle M is connected to one side of the base 200. The plurality of baffle fins 300 is connected to the other side of the base 200. The baffle fins 300 each have a first end 310 disposed anteriorly and a second end 320 disposed posteriorly. The mask 400 covers the baffle fins 300 from above. The mask 400 has a plurality of air inlets 410 and a plurality of air outlets 420. The air inlets 410 open downward. The air inlets 410 are disposed on the bottom side of the mask 400 anteriorly and correspond in position to the first ends 310 of the baffle fins 300, respectively. The air outlets 420 are disposed at the mask 400 posteriorly and correspond in position to the second ends 320 of the baffle fins 300. The support frame 500 is disposed on top of the electric vehicle M to support and lift the mask 400. With the support frame 500 being hollowed out, air is introduced into the baffle structure 100 through the air inlets 410 disposed on the bottom side of the mask 400 while the electric vehicle M is advancing in a direction D. The solar panels 600 are disposed above the mask 400 to receive sunlight and generate electrical power. The solar panels 600 have flexibility and thus can be mounted on the mask 400 which may have curved surfaces.

Figure 3A:
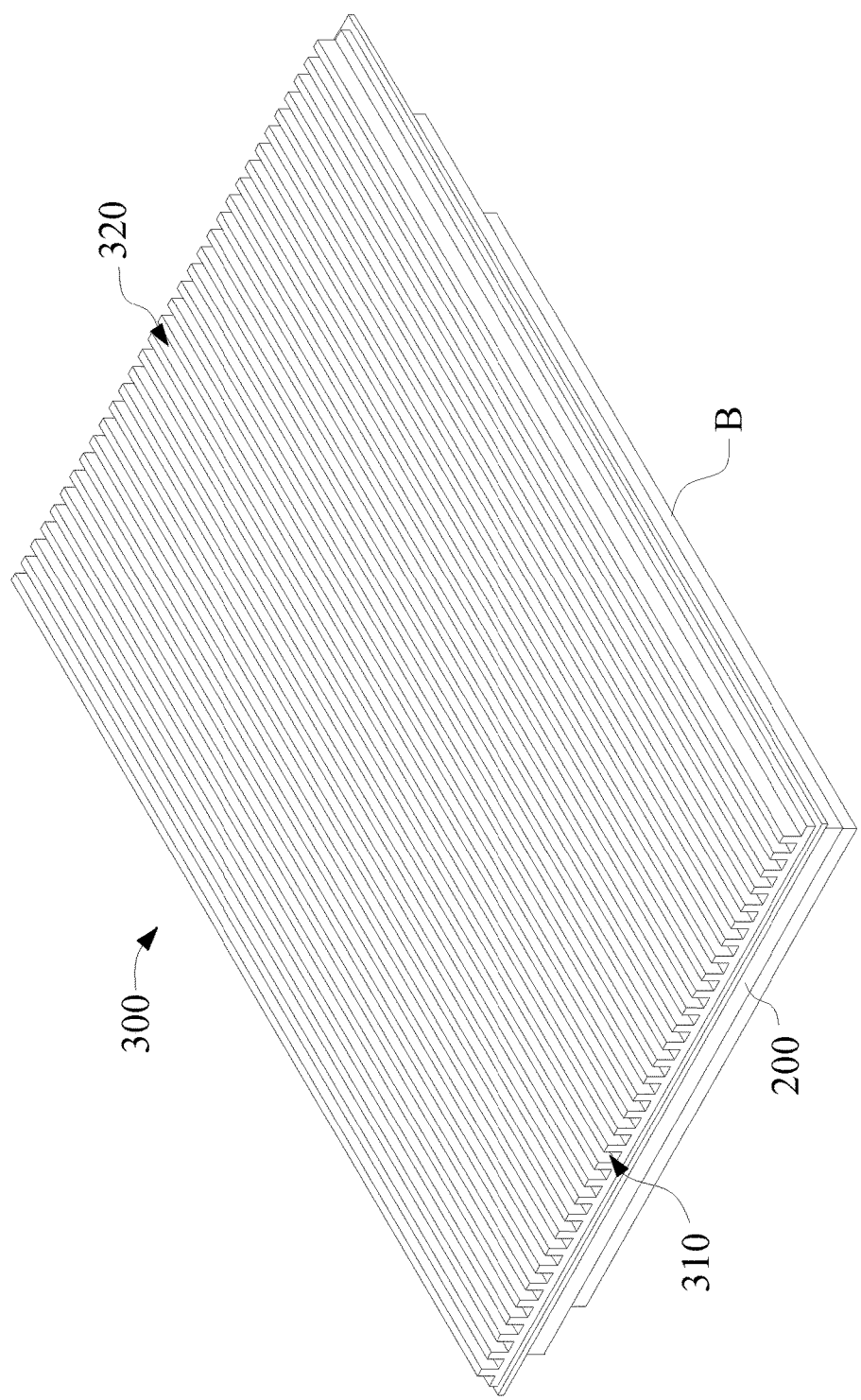
FIG. 3A is a schematic view of baffle fins of the baffle structure for heat dissipation of FIG. 1.
Figure 3B:
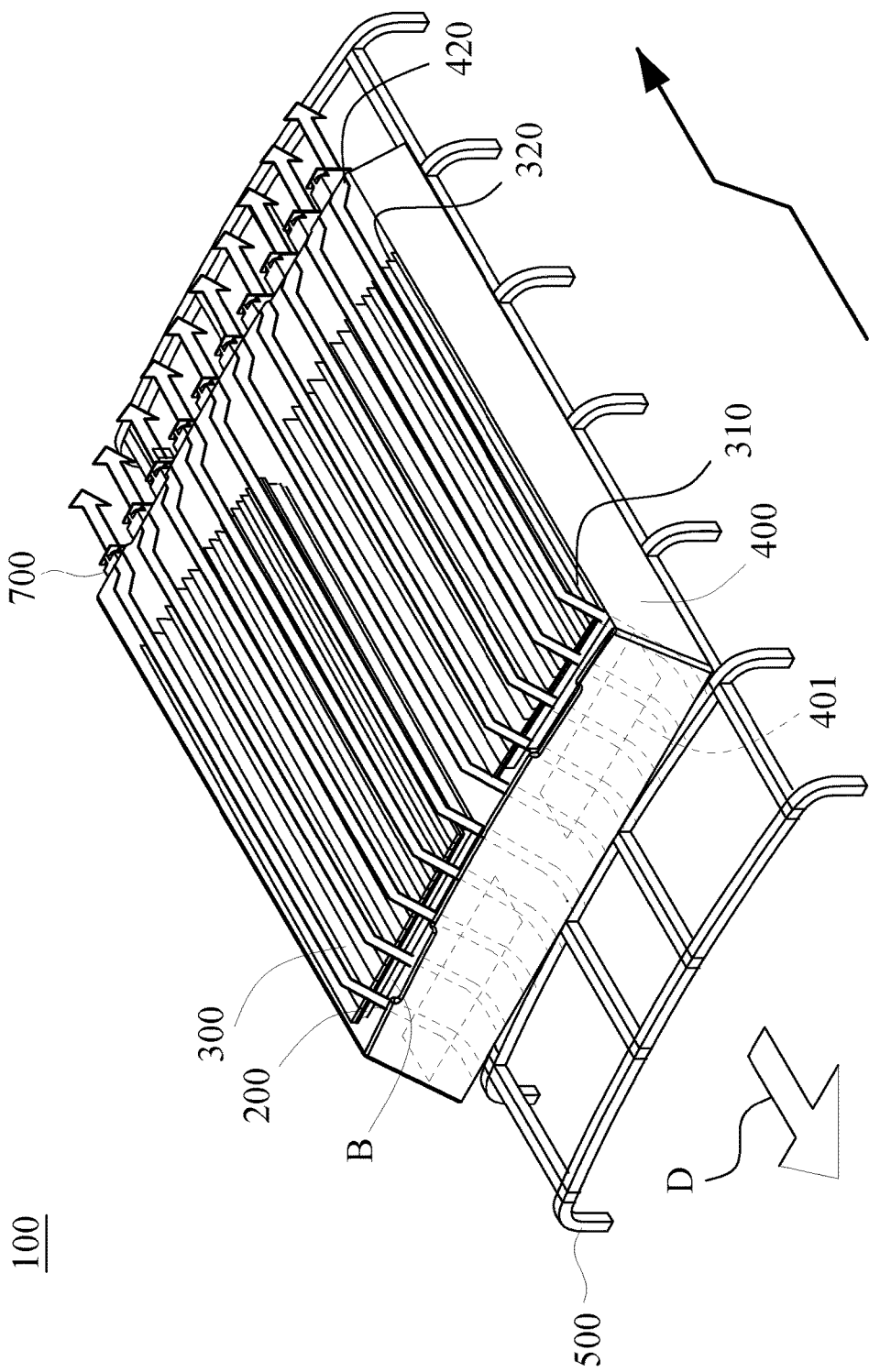
FIG. 3B is a schematic view of how to dissipate heat by the baffle structure for heat dissipation of FIG. 1.

Referring to FIG. 3A and FIG. 3B, in this embodiment, each air inlet 410, a corresponding one of the baffle fins 300 and a corresponding one of the air outlets 420 are linearly aligned. Hence, air is admitted to the air inlets 410 while the electric vehicle M is advancing in the direction D. The air thus admitted passes the baffle fins 300 to take up heat therefrom and is guided by the baffle fins 300 on its journey to the air outlets 420. Finally, the air is discharged from the baffle structure 100 for heat dissipation. Furthermore, air is no longer admitted to the air inlets 410 as soon as the electric vehicle M stops advancing. To keep discharging hot air from the mask 400, the air outlets 420 are equipped with the axial fans 700, and the axial fans 700 are electrically connected to the solar panels 600 to receive electrical power therefrom, thereby enabling the axial fans 700 to function.

Figure 4A:
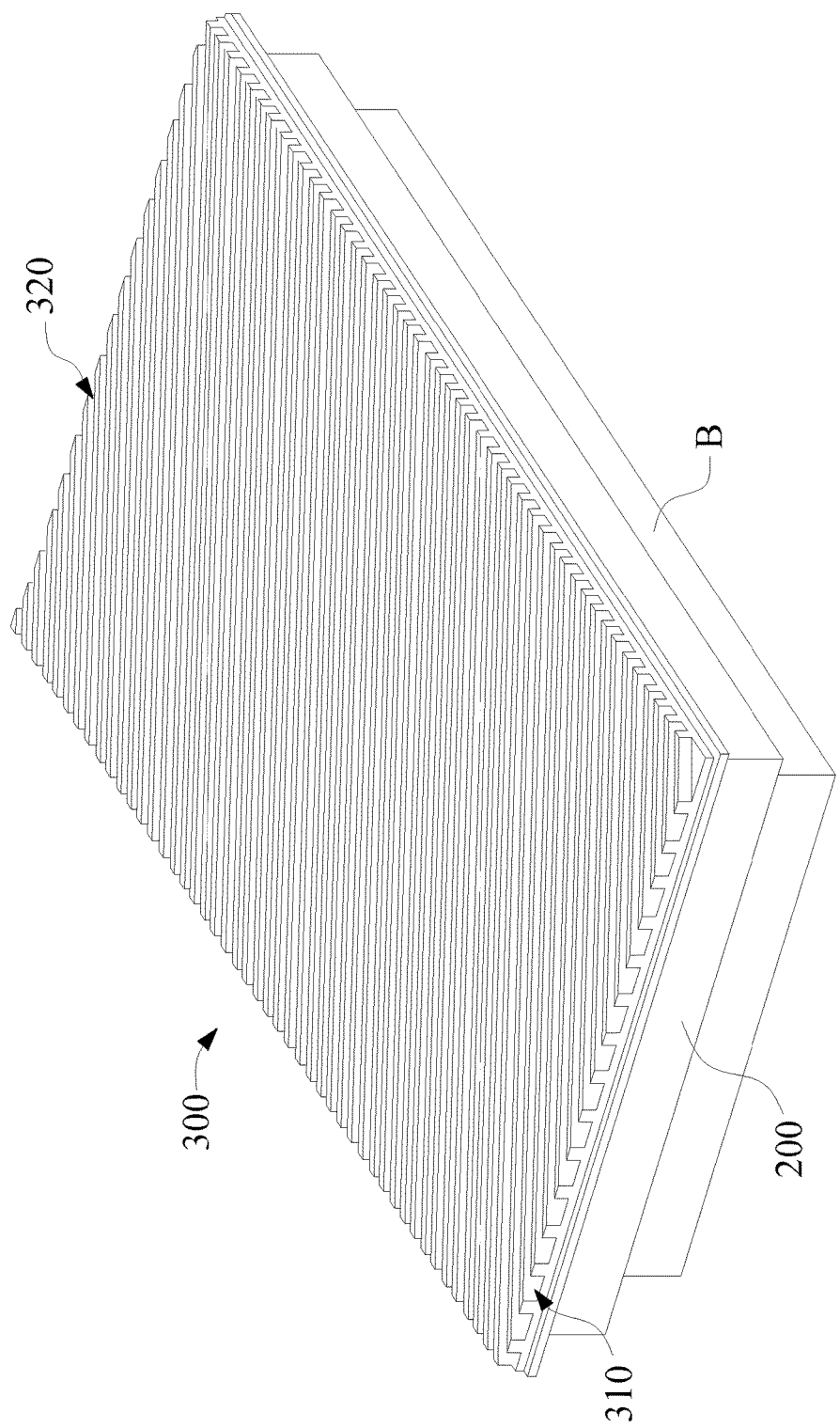
FIG. 4A is a schematic view of a mask and baffle fins of the baffle structure for heat dissipation according to another embodiment of the present invention.
Figure 4B:
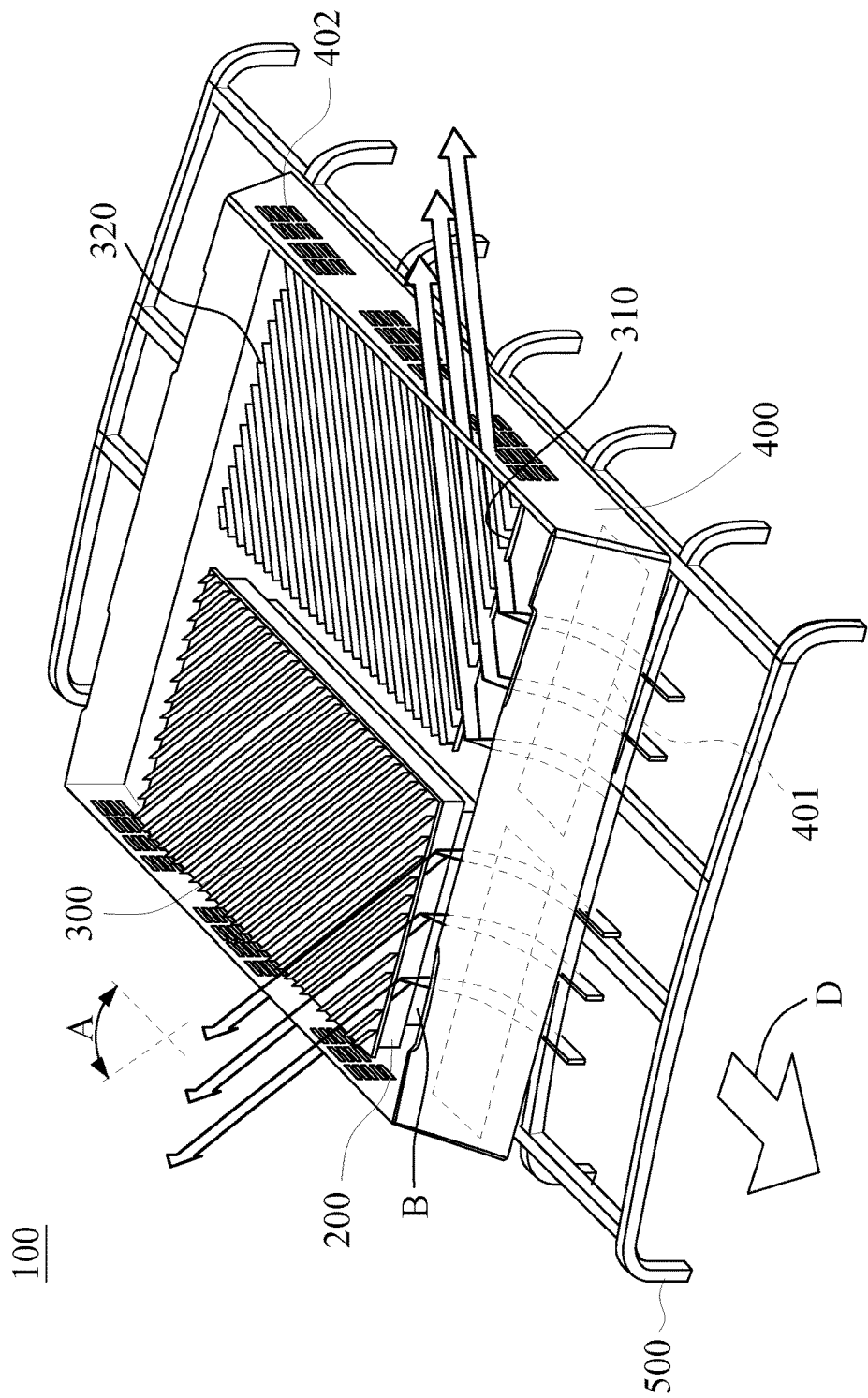
FIG. 4B is a schematic view of how to dissipate heat by the baffle structure for heat dissipation of FIG. 4A.

Referring to FIG. 4A and FIG. 4B, in another embodiment, the air outlets 420 are disposed on a lateral side of the mask 400 and open toward two lateral sides of the electric vehicle M, whereas the second ends 320 are disposed on a lateral side of the base 200 and correspond in position to the air outlets 420, respectively. An included angle of 40° is formed between the direction D and a line joining the first and second ends 310, 320. Hence, the baffle structure 100 for heat dissipation not only guides hot air to the two sides of the mask 400 for discharge but also features increased surface area of the air outlets 420, thereby enhancing the efficiency of heat dissipation.

In the aforesaid embodiments of the present invention, a baffle structure for heat dissipation is effective in discharging hot air from an electric vehicle on top of which the baffle structure is mounted, dispenses with the need for any air conditioning system otherwise disposed inside the electric vehicle and adapted to cool a battery pack of the electric vehicle, reduces power consumption of the battery pack, and does not take up any space inside the electric vehicle.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A baffle structure for heat dissipation, mounted on an electric vehicle on top of which a battery pack is mounted, the baffle structure comprising:
    a base connected to the battery pack;
    a plurality of baffle fins disposed on the base and each having a first end and a second end; and
    a mask for covering the baffle fins, the mask comprising:
        at least an air inlet corresponding in position to the first ends of the baffle fins; and
        at least an air outlet corresponding in position to the second ends of the baffle fins;
    wherein the first ends of the baffle fins are toward to a direction that the electric vehicle is advancing, and the second ends of the baffle fins are opposite to the direction, and air is admitted to the air inlets and passes the baffle fins to take up heat therefrom and is guided by the baffle fins to the air outlets and is discharged from the baffle structure for heat dissipation while the electric vehicle is advancing in the direction.

2. The baffle structure for heat dissipation of claim 1, further comprising a support frame disposed on top of the electric vehicle and adapted to support and lift the mask.

3. The baffle structure for heat dissipation of claim 2, wherein the at least an air inlet opens downward.

4. The baffle structure for heat dissipation of claim 1, further comprising at least an axial fan disposed at the at least an air outlet.

5. The baffle structure for heat dissipation of claim 1, wherein the at least an air outlet opens laterally relative to the electric vehicle.

6. The baffle structure for heat dissipation of claim 5, wherein the at least an air outlet is provided in a plural number to open toward two lateral sides of the electric vehicle.

7. The baffle structure for heat dissipation of claim 1, further comprising at least a solar panel disposed above the mask.

8. The baffle structure for heat dissipation of claim 7, wherein the at least a solar panel has flexibility.

9. The baffle structure for heat dissipation of claim 7, further comprising at least an axial fan disposed at the at least an air outlet and connected to the at least a solar panel to receive electrical power therefrom.

10. The baffle structure for heat dissipation of claim 5, wherein an included angle of 40° is formed between the direction the electric vehicle is advancing a line joining the first end and the second end an included angle of 40° is formed.

* * * * *